Jan. 15, 1963 C. G. DAVIS 3,073,904

DUAL ENCODER FOR PCM

Filed July 2, 1959

2 Sheets-Sheet 1

INVENTOR
C. G. DAVIS

BY R. B. Ardis

ATTORNEY

Jan. 15, 1963

C. G. DAVIS 3,073,904

DUAL ENCODER FOR PCM

Filed July 2, 1959

2 Sheets-Sheet 2

INVENTOR
C. G. DAVIS
BY R. B. Ardis
ATTORNEY 3,073,904

DUAL ENCODER FOR PCM

Claude G. Davis, Morristown, N.J., assignor to Bell Telephone Laboratories, Incorporated, New York, N.Y., a corporation of New York Filed July 2, 1959, Ser. No. 824,731
3 Claims. (Cl. 179—15)

This invention relates to transmitters for pulse type communication systems and more particularly to encoders for use in the transmitters of communication systems employing pulse code modulation.

In pulse code modulation communication systems, a speech wave or other signal to be transmitted is sampled periodically to ascertain its instantaneous amplitude. The measured instantaneous amplitudes (PAM signals) are then expressed in pulse codes by encoders. The proper functioning of an encoder is dependent upon both the PAM sample voltage remaining constant during the period of encoding and disappearing before the next sample appears. The former requires good low frequency response; the latter good high frequency response. This results in wide bandwidth requirements for the sampling gates and to avoid these wide bandwidth requirements earlier PCM systems used two buses and a transfer gate preceding the encoder. The PAM samples were alternately applied to each bus and the transfer gate connected the encoder to the proper bus. This approach allowed time for the discharge of one bus while a sample on the other was being encoded, and vice versa, thus reducing the bandwidth requirements for the sampling gates.

Because the transfer gate switched between analog signals the problems of crosstalk and the successful introduction of a D.-C. bias (to produce unipolar pulses from the analog signals) at the transfer gate were present. If the $n$th sample and the $(n+1)$th sample differed greatly in magnitude stray capacitance in the transfer gate would produce crosstalk. Elimination of this crosstalk in the above-described system would require expensive and complicated transfer gates and drive circuitry. Transfer gates adequate to perform the switching function without introducing crosstalk may even be equal in cost to a complete encoder.

One object of the invention is to avoid crosstalk in a dual-input PCM encoder in as simple and inexpensive a manner as possible.

A related object is to reduce the bandwidth requirements of the sampling apparatus of a PCM encoder without introducing undesirable interchannel crosstalk.

Still another object of the invention is to avoid any necessity for highly complex and expensive gate circuits in a multichannel PCM encoder.

This invention employs dual encoding apparatus which encodes both the odd and even PAM channels separately. Gating means is employed at the output of this dual encoding apparatus to transmit each encoded signal to a single output channel in the proper time sequence. Since such gating means is switching between digital signals (which are of equal amplitude), the problem of crosstalk is greatly reduced or completely eliminated. A common control circuit controls the sequential operation of both encoding networks of the dual encoder.

The invention will be more fully comprehended from the following detailed description taken in conjunction with the drawings, in which.

Figure 1:
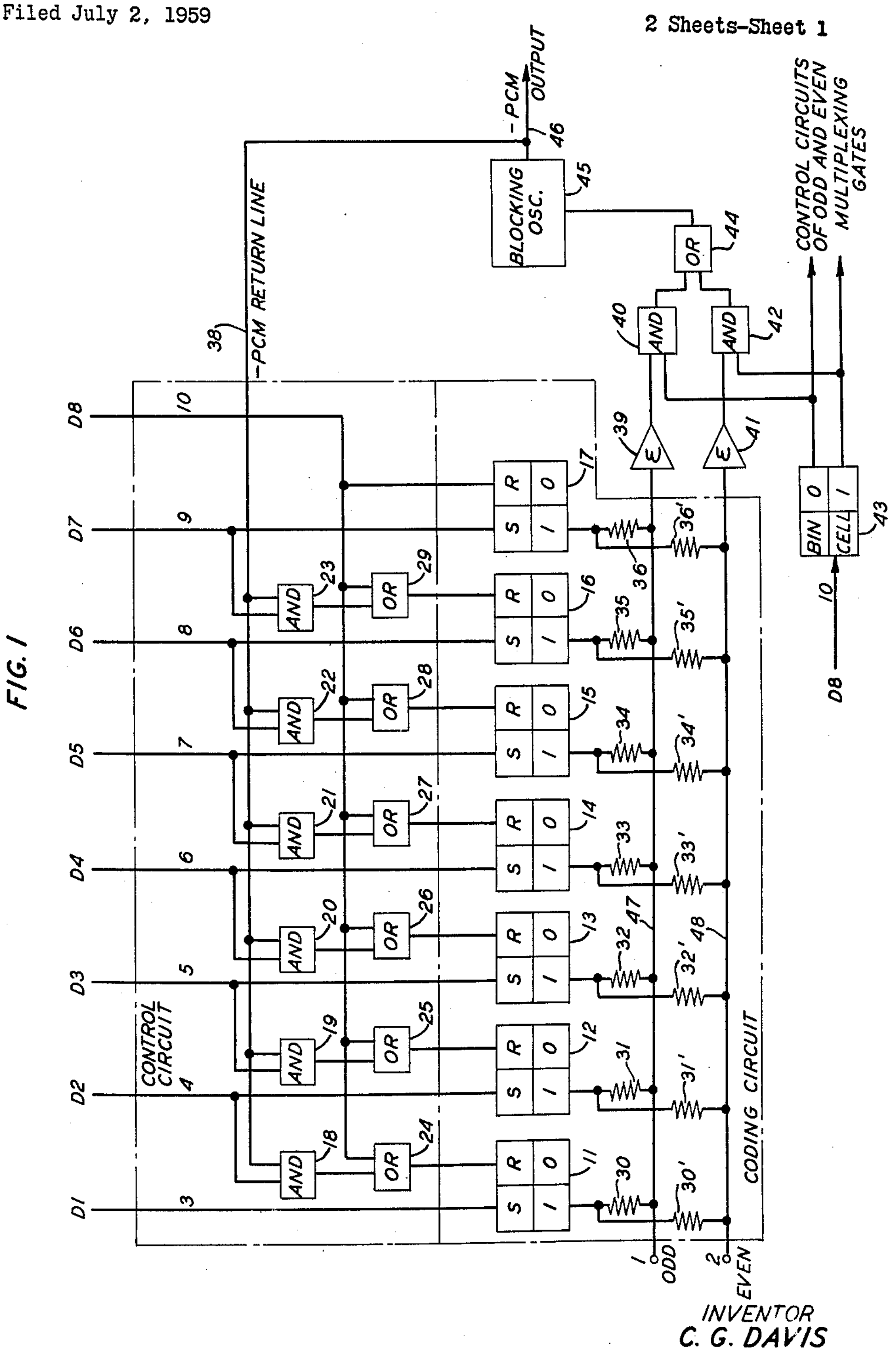
FIG. 1 is a block diagram of a seven-digit dual encoder embodying the invention.
Figure 2:
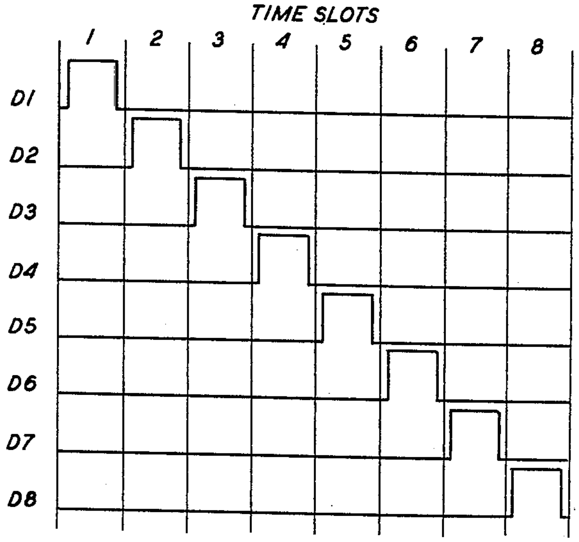
FIG. 2 shows the control digit pulses which sequentially operate the encoder.

A seven-digit dual encoder embodying the invention is shown in FIG. 1. The pulse amplitude modulated (PAM) samples to be encoded are alternately applied by means of multiplexing gates to the odd 1 and even 2 input channels of the encoder. Control pulses D1 through D8, shown in FIG. 2, which appear in the first through eighth time slots, respectively, are applied to inputs 3 through 10, respectively, of the control circuit of the encoder. AND gates 18 through 23 and OR gates 24 through 29 comprise the control circuit which sequentially operates the encoder. AND circuits and OR circuits have two or more inputs and a single output. The AND circuit has an output signal only when input signals are applied simultaneously to all inputs; the OR circuit has an output if an input signal is applied to any one or more of the inputs.

Flip-flop circuits 11 through 17 and weighting resistances 30 through 36 and 30' through 36' comprise the coding circuit of the encoder. Inputs 3 through 9 are connected to flip-flops 11 through 17, respectively, in such a manner that the application of a pulse on an input line triggers the respective flip-flop into the one of its two stable conditions, which causes a reference voltage to be applied to the weighting resistors connected to the output of the flip-flop. This operation is called setting the flip-flop, and is indicated in the drawing of a flip-flop by the input line entering the S portion of the box representing the flip-flop with the weighting resistors being drawn to the "1" portion of the box representing the flip-flop. Inputs 4 through 9 are connected to one input of AND gates 18 through 23, respectively. The second input to each AND gate 18 through 23, respectively, is connected to PCM return line 38. The output of each AND gate 18 through 23, respectively, is connected to one input of OR gates 24 through 29, respectively. The second input of OR gates 24 through 29, respectively, is connected to input line 10. Input line 10 is directly connected to flip-flop 17 in such a manner that the application of a pulse to input line 10 triggers flip-flop 17 into the one of its two stable conditions, which causes a ground to be applied to weighting resistors 36 and 36' connected to the output of flip-flop 17. This operation is called resetting the flip-flop and is indicated in the drawing of a flip-flop by having the line through which the resetting pulse is applied enter the R portion of the box representing the flip-flop and having no output line enter the "O" portion of the box representing the flip-flop. The output of OR gates 24 through 29, respectively, is connected to flip-flops 11 through 17, respectively, in such a manner that the appearance of a pulse on the output of an OR gate resets the flip-flop.

The outputs of flip-flops 11 through 17, respectively, are connected to weighting resistors 30 through 36, respectively, and 30' through 36', respectively. Odd input channel 1 is connected by means of conductor 47 to the other ends of weighting resistors 30 through 36 and even input channel 2 is connected by means of conductor 48 to the other ends of resistors 30' through 36'. Odd input channel 1 is also connected by means of conductor 47 to the input of error amplifier 39 whose output is connected to AND gate 40. Even input channel 2 is connected by means of conductor 48 to the input of error amplifier 41 whose output is connected to one input of AND gate 42. Error amplifiers 39 and 41 are stable high gain D.-C. amplifiers; each has a low impedance input which acts as a current summing node in a manner to be described. The second input of AND gate 40 is connected to one output of binary cell 43, which is a bistable circuit with two outputs and a single input connected to input line 10. The second output of binary cell 43 is connected to the second input of AND gate 42. The outputs of binary cell 43 are also connected to the control circuits of the odd and even multiplexing gates so that AND gate 40 is actuated at the same time that a sample is applied to odd input channel 1 and AND gate 42 is actuated when a sample is applied to even input channel 2. The outputs of AND gates 40 and 42 are connected to the input of OR gate 44 whose output is connected to the input of a triggered blocking oscillator 45. The output of blocking oscillator 45 is connected to —PCM return line 38 and to the output terminal 46 of the dual encoder. Since this dual encoder uses the binary code, weighting resistors 30 through 36 and 30′ through 36′ are related in binary fashion so that if resistors 30 and 30′ are equal to R, then resistors 31 and 31′ are equal to 2R; resistors 32 and 32′ are equal to 4R; resistors 33 and 33′ are equal to 8R; resistors 34 and 34′ are equal to 16R; resistors 35 and 35′ are equal to 32R; and resistors 36 and 36′ are equal to 64R.

The PAM samples are alternately applied to the odd 1 and even 2 input channels in accordance with the output of binary cell 43 which controls the multiplexing gates. During the encoding of a sample the previously encoded sample on the other channel is removed and a new sample applied. The exact timing of the removal of the already encoded sample and the application of a new sample is unimportant so long as the sample is present during the entire coding period. During the eighth time slot the coder is reset and the circuits prepared to encode the sample on the other bus. For the sake of description it is assumed that a PAM signal has been applied to the odd 1 channel at the beginning of the first time slot. Digit control signal D1 sets flip-flop 11 so that resistor 30 is connected to a reference voltage. Resistor 30 draws sixty-four units of current. If the input sample exceeds sixty-four units then current flows through conductor 47 to error amplifier 39. Error amplifier 39 generates no output when current flows into it. If the input sample is less than sixty-four units of current then current flows from error amplifier 39 to resistor 30. When current flows from error amplifier 39 to resistor 30 error amplifier 39 produces an output. This output passes through previously actuated AND gate 40 and OR gate 44 to the input of blocking oscillator 45. Blocking oscillator 45 generates a pulse output which is returned to flip-flop 11 by means of PCM return line 38, AND gate 18 and OR gate 24. The pulse output appears at AND gate 18 at the same time as control pulse D2 and therefore passes through AND gate 18. The pulse output of a blocking oscillator resets flip-flop 11 to its zero position where the output of the flip-flop is at ground potential. If the PAM sample exceeds sixty-four units, flip-flop 11 remains in its set position but if the PAM sample is less than sixty-four units, flip-flop 11 is reset to its zero position.

During the second time slot, pulse D2 sets flip-flop 12 so that weighting resistor 31 is connected to a reference voltage. Resistor 31 draws thirty-two units of current. If flip-flop 11 is still in its set position the pulse sample must be greater than 64+32 units in order for current to flow into the error amplifier 39. If the sample is less than 64+32 units, current flows from error amplifier 39 into resistor 32. If current flows into error amplifier 39 no output is generated and flip-flop 12 remains in its set position. If, however, current flows out of error amplifier 39 there is an output from the error amplifier. This output passes through AND gate 40 and OR gate 44 causing blocking oscillator 45 to generate a pulse which is returned to flip-flop 12 through PCM return line 38, AND gate 19 and OR gate 25. AND gate 19 passes this pulse since it appears at AND gate 19 simultaneously with D3. The pulse causes flip-flop 12 to be reset so that resistor 31 is connected to ground. If flip-flop 11 was reset during the first time slot the pulse sample must be greater than thirty-two units in order for current to flow in the error amplifier. If the sample is less than thirty-two units current flows from error amplifier 39. If current flows into error amplifier 39 no output is generated and flip-flop 12 remains set. If, however, current flows out of error amplifier 39 then there is an output from the error amplifier which causes flip-flop 12 to be reset.

The above-described process continues with each flip-flop 13 through 17 being initially set by the occurrence of digit pulses D3 through D7. An output pulse is produced as is above described only when it is necessary for error amplifier 39 to supply current to the weighting resistors whose flip-flops are set. No output pulse is produced when the PAM sample causes current to flow into error amplifier 39. At the end of the seventh time slot, pulse D8 which is applied to input 10 causes binary cell 43 to change states. Since the sampling counters are controlled by the output of binary cell 43 the next PAM sample is applied to even input channel 2. AND gate 42 is actuated by the output of binary cell 43 in order to provide a path from error amplifier 41 to OR gate 44. AND gates 40 and 42 together with OR gate 44 function as a transfer gate. Since input 10 is applied to flip-flops 11 through 16 by means of OR gates 24 through 29, respectively, and is also directly connected to reset flip-flop 17, control pulse D8 resets all flip-flops 11 through 17 in preparation for encoding the next input sample.

The encoding of the second input sample is accomplished in the same manner as described for the first input sample except for the fact that weighting resistors 30′ through 36′ and error amplifier 41 are now connected to OR gate 44 as AND gate 42 has been actuated by binary cell 43. AND gate 40 is now inoperative. Any sample remaining on odd input channel 1 has no effect on the encoder since the associated circuitry of odd input channel 1 has been rendered inoperative. The sample remaining on odd input channel 1 need only disappear during the next eight time slots in order to insure proper encoding. This greatly reduces the low frequency requirements and therefore the bandwidth requirements of the sampling counters resulting in reducing the cost of the sampling counters. At the conclusion of the seventh time slot of encoding the second sample, all the flip-flops are again reset. Even input channel 2 and its associated circuitry is rendered inoperative and odd channel input 1 and its associated circuitry is actuated. The encoding process continues in the manner above described.

Figure 3:
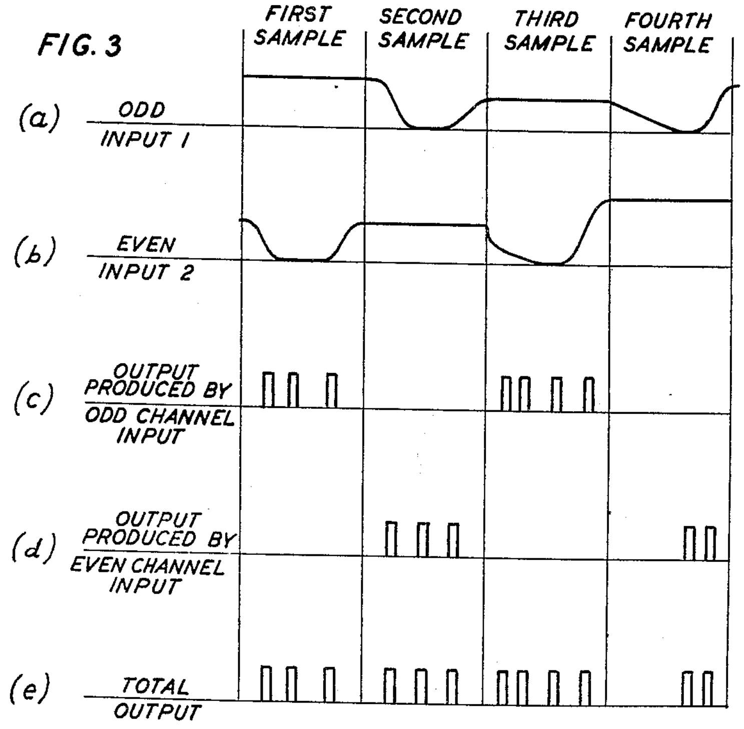
FIG. 3 shows the outputs of the Odd and Even input channels and the total output in response to input samples.

FIG. 3 illustrates the results achieved by this invention. In line (*a*) of FIG. 3 the PAM samples applied to the odd input channel 1 are shown; line (*b*) of FIG. 3 shows the PAM samples applied to even input channel 2.

The pulses shown in line (*c*) of FIG. 3 represent the output of error amplifier 39 when the odd channel input 1 is actuated; the pulses shown in line (*d*) of FIG. 3 represent the output of error amplifier 41 when even channel input 2 is actuated. Since odd input channel 1 is not operative during the second sample, the signal remaining on the odd input channel 1 produces no spurious effect on the total output of the encoder. Similarly, there is no spurious output produced by the even channel input 2 during the first and third samples since the even channel is rendered inoperative during these samples. The total output of the encoder is shown in line (*e*) of FIG. 3 and is the sum of the outputs shown in lines (*c*) and (*d*) of FIG. 3.

The output appearing at terminal 46 of the blocking oscillator is the inverse of the usual binary code. That is to say, if the sample is sufficient in amplitude to cause current to flow into the error amplifier no output pulse is produced; if the error amplifier must supply current to the weighting resistors an output pulse is produced. This output contains all the information contained in the usual binary code and is usually transmitted without the necessity of conversion to the usual binary code.

It is to be understood that the above-described arrangements are illustrative of the application of the invention. Numerous other arrangements may be devised by those skilled in the art without departing from the spirit and scope of the invention.

What is claimed is:

1. A substantially crosstalk-free pulse code modulation encoding system for converting a succession of signal amplitude samples into a corresponding succession of coded sequences of marks and spaces, the marks and spaces of each coded sequence occupying a predetermined number of consecutive time slots, which comprises a pair of input channels carrying respectively alternate ones of a succession of signal amplitude samples, a source of a control pulse which is generated between the occurrence of each of said coded sequences of marks and spaces, a first weighted network for weighing only those signal amplitude samples appearing in one of said input channels, a second weighted network for weighing only those signal amplitude samples appearing in the other of said input channels, logic circuitry common to both of said weighted networks for controlling the sequential operation of said weighted networks so that under the control of said common logic circuitry each of said weighted networks functions as an encoder, a common output channel, and a transfer gate responsive to said control pulse which is generated between the occurrence of each coded sequence of marks and spaces for connecting said first and second weighted networks alternately to said common output channel in synchronism with the sequence of said amplitude samples in said input channels.

2. A substantially crosstalk-free pulse code modulation encoding system which comprises a pair of input channels carrying respectively alternate ones of a succession of signal amplitude samples, a first sequentially operated encoding network for encoding only those signal amplitude samples appearing in one of said input channels, a second sequentially operated encoding network for encoding only those signal amplitude samples appearing in the other of said input channels, a common control circuit for controlling the sequential operation of both of said encoding networks, a common output channel, a transfer gate for connecting said first and second encoding networks alternately to said common output channel in synchronism with the sequence of signal amplitude samples in said input channels, and means for feeding back encoded samples from said common output channel to said common control circuit to control the operation thereof.

3. A substantially crosstalk-free system for converting a succession of signal amplitude samples into a corresponding succession of coded sequences of marks and spaces, the marks and spaces of each said coded sequence occupying a predetermined number of consecutive time slots, which comprises a pair of input channels carrying respectively alternate ones of said succession of signal amplitude samples, means in each of said input channels for comparing said signal amplitude samples with successively different amplitude standards during successive time slots, means in each of said input channels for generating a mark or a space during each time slot depending upon whether a signal amplitude sample is greater or lesser than the amplitude standard with which it is compared during that time slot, a common output channel, a transfer gate for supplying sequences of marks and spaces from said input channel alternately to said output channel in synchronism with the sequence of signal amplitude samples in said input channel, and means for feeding back marks and spaces from said common output channel to determine the magnitudes of said successive different amplitude standards in each of said input channels.

References Cited in the file of this patent

UNITED STATES PATENTS

| | | |
|---|---|---|
| 2,504,354 | Roschke | Apr. 18, 1950 |
| 2,636,081 | Feldman | Apr. 21, 1953 |
| 2,946,851 | Kretzmer | July 26, 1960 |

FOREIGN PATENTS

| | | |
|---|---|---|
| 686,439 | Great Britain | Jan. 21, 1953 |

OTHER REFERENCES

Meacham et al.: "An Experimental Multichannel Pulse Code Modulation System of Toll Quality," The Bell System Technical Journal, January 1948, pp. 1–43 relied on.

Shunaman: "Pulse Code Modulation," Radio-Craft, February 1948, pp. 28–30 and 47 relied on.